US011777944B2

(12) United States Patent
Zhang et al.

(10) Patent No.: US 11,777,944 B2
(45) Date of Patent: Oct. 3, 2023

(54) SCALABLE AUTHENTICATION MANAGEMENT

(71) Applicant: International Business Machines Corporation, Armonk, NY (US)

(72) Inventors: Feng Zhang, Beijing (CN); Peng Hui Jiang, Beijing (CN); Ting Yin, Beijing (CN); Jun Su, Beijing (CN); Zhe Hua Peng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 17/361,540

(22) Filed: Jun. 29, 2021

(65) Prior Publication Data

US 2022/0417250 A1    Dec. 29, 2022

(51) Int. Cl.
*G06F 21/44* (2013.01)
*G06F 21/71* (2013.01)
*H04L 9/40* (2022.01)
*G06F 21/45* (2013.01)
*G06F 21/78* (2013.01)

(52) U.S. Cl.
CPC ........ *H04L 63/102* (2013.01); *H04L 63/0876* (2013.01); *H04L 63/105* (2013.01); *H04L 63/20* (2013.01)

(58) Field of Classification Search
None
See application file for complete search history.

(56) References Cited

U.S. PATENT DOCUMENTS

| 8,898,747 | B2 * | 11/2014 | Lin | ............... H04L 63/205 |
| | | | | 726/4 |
| 9,942,048 | B2 | 1/2018 | Oberheide | |
| 2010/0058449 | A1 | 3/2010 | Kamakura | |
| 2017/0223117 | A1 | 8/2017 | Messerli | |
| 2019/0007409 | A1 | 1/2019 | Totale | |
| 2019/0097993 | A1 | 3/2019 | Iwashita | |
| 2021/0297417 | A1* | 9/2021 | Pogrebinsky | ......... H04L 63/107 |

(Continued)

FOREIGN PATENT DOCUMENTS

| CN | 107040501 A | 8/2017 |
| CN | 109561098 A | 4/2019 |

(Continued)

OTHER PUBLICATIONS

"Authenticating corporate users in a hybrid environment", Solutions, Dec. 29, 2020, 14 pps., <https://cloud.google.com/solutions/authenticating-corporate-users-in-a-hybrid-environment>.

(Continued)

*Primary Examiner* — Venkat Perungavoor
(74) *Attorney, Agent, or Firm* — Gilbert Harmon, Jr.

(57) ABSTRACT

Authentication management by receiving a request to initiate an authentication from a computing device of a user, directing the request to a selected authentication service of a plurality of authentication services, wherein the selected authentication service is determined dynamically based on respective authentication metrics of the plurality of authentication services, receiving authentication information via the selected authentication service, and authenticating the user based on the received authentication information.

20 Claims, 7 Drawing Sheets

(56) References Cited

U.S. PATENT DOCUMENTS

2022/0012326 A1\* 1/2022 Ratnakaram ............ G06F 21/44

FOREIGN PATENT DOCUMENTS

EP          2159984 A2 \* 3/2010 ............. H04L 63/08
KR       101213984 B1     8/2012

OTHER PUBLICATIONS

"Choose the right authentication method for your Azure Active Directory hybrid identity solution", Oct. 30, 2019, 16 pps., Microsoft Docs, <https://docs.microsoft.com/en-us/azure/active-directory/hybrid/choose-ad-authn>.

Dzimchuk, "Implementing hybrid authentication in Azure", Aug. 16, 2018 on Azure Active Directory, Security, 8 pps., <https://dzimchuk.net/implementing-hybrid-authentication-in-azure/>.

Mell et al., "The NIST Definition of Cloud Computing", National Institute of Standards and Technology, U.S. Department of Commerce, NIST Special Publication 800-145, Sep. 2011, 7 pages.

Moghaddam et al., "A Scalable and Efficient User Authentication Scheme for Cloud Computing Environments", 2014 IEEE Region 10 Symposium, Conference Paper—Apr. 2014, 7 pps., <https://www.researchgate.net/publication/264197050>.

Patel et al., "Access Control Framework Using Multi-Factor Authentication in Cloud Computing", International Journal of Green Computing vol. 9 • Issue 2 • Jul.-Dec. 2018, 15 pps., <https://www.researchgate.net/publication/330208949>.

Singh et al., "Design and Implementation of Multi-tier Authentication Scheme in Cloud", IJCSI International Journal of Computer Science Issues, vol. 9, Issue 5, No. 2, Sep. 2012, ISSN (Online): 1694-0814, 8 pps., <https://www.researchgate.net/publication/257651271>.

International Search Report and Written Opinion, International Application No. PCT/CN2022/100359, International Filing Date Jun. 22, 2022.

\* cited by examiner

SCALABLE AUTHENTICATION MANAGEMENT

BACKGROUND

The disclosure relates generally to computing. The disclosure relates particularly to scalable authentication management.

With modern computing workloads moving to cloud computing environments, hybrid cloud solutions have paved the way into the modern cloud computing era. Hybrid cloud is a solution that combines a private cloud with one or more public cloud services, with proprietary software enabling communication between each distinct service. A hybrid cloud strategy provides businesses with greater flexibility by moving workloads between cloud solutions as needs and costs fluctuate. Hybrid cloud services are powerful because they give businesses greater control over their private data. An organization can store sensitive data on a private cloud or local data center and simultaneously leverage the robust computational resources of a managed public cloud. A hybrid cloud relies on a single plane of management, unlike a multi-cloud strategy wherein admins must manage each cloud environment separately.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable authentication management.

Aspects of the invention disclose methods, systems and computer readable media associated with authentication management by receiving a request to initiate an authentication from a computing device of a user, directing the request to a selected authentication service of a plurality of authentication services, wherein the selected authentication service is determined dynamically based on respective authentication metrics of the plurality of authentication services, receiving authentication information via the selected authentication service, and authenticating the user based on the received authentication information.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Embodiments of the present disclosure recognize that in current cloud environments authenticators provide various technological solutions to authenticate a user request, such as, but not limited to, SMS authentication, user login & credential, signature, cookie authentication, third-party authentication, token auth, bio-authentication, etc. For example, an emerging issue (e.g., authentication management) comes along with the adoption of a hybrid cloud environment. However, challenges still exist in the various authentication technological solutions with respect to problems such as late response and non-responsive servers. Embodiments of the present disclosure provide dynamic authentication mechanisms based on a ring-based authentication infrastructure.

According to embodiments in the present disclosure, a user profile, which stores authentication information of the user corresponding to a plurality of authentication services, may be associated with the user, such that when an authentication request is directed to a next authentication service, the authentication information of the user corresponding to the next authentication service may be retrieved from the user profile. Additionally, authentication metrics may be selected from the group consisting of: a user level metric, a performance metric, a security level metric of the resources being accessed, a historical success rate metric, and an access frequency metric. Furthermore, the respective authentication metrics of the plurality of authentication services and the respective authentication metrics of the plurality of service tiers, which each node on a ring of a ring-based authentication infrastructure is a cluster of N-tiered service that provide an authentication method of the same type, may be updated in real-time or periodically.

In an embodiment, one or more components of the system can employ hardware and/or software to solve problems that are highly technical in nature (e.g., user authentication). These solutions are not abstract and cannot be performed as a set of mental acts by a human due to the processing capabilities needed to facilitate authentication management in a hybrid cloud environment, for example. Further, some of the processes performed may be performed by a specialized computer for carrying out defined tasks related to directing the request to a selected service tier of the selected authentication service. For example, a specialized computer can be employed to carry out tasks related to authentication management in a hybrid cloud environment or the like.

Implementation of embodiments of the invention may take a variety of forms, and exemplary implementation details are discussed subsequently with reference to the Figures.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Embodiments of the present disclosure may be implemented with, however not limited to, a cloud computing environment which will be described in the following.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
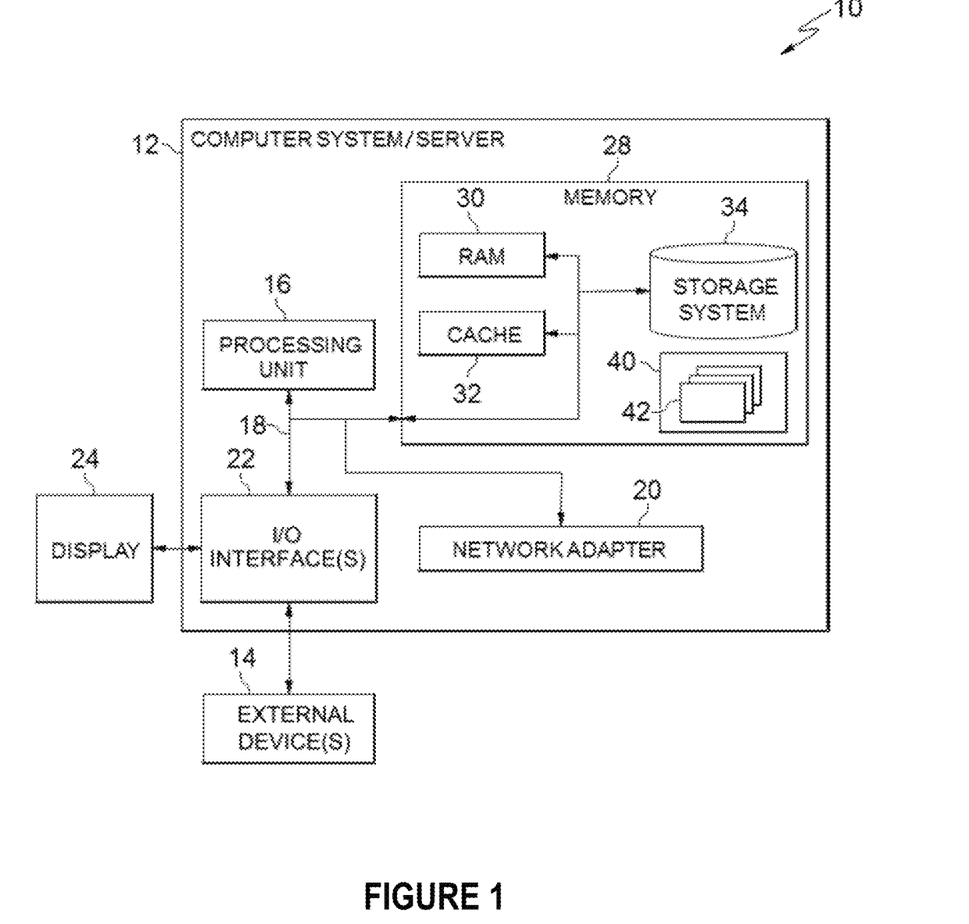
FIG. 1 depicts a cloud computing node, according to an embodiment of the present disclosure.

Referring now to FIG. 1, a schematic of an example of a cloud computing node is shown, according to an embodiment of the present disclosure. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general-purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
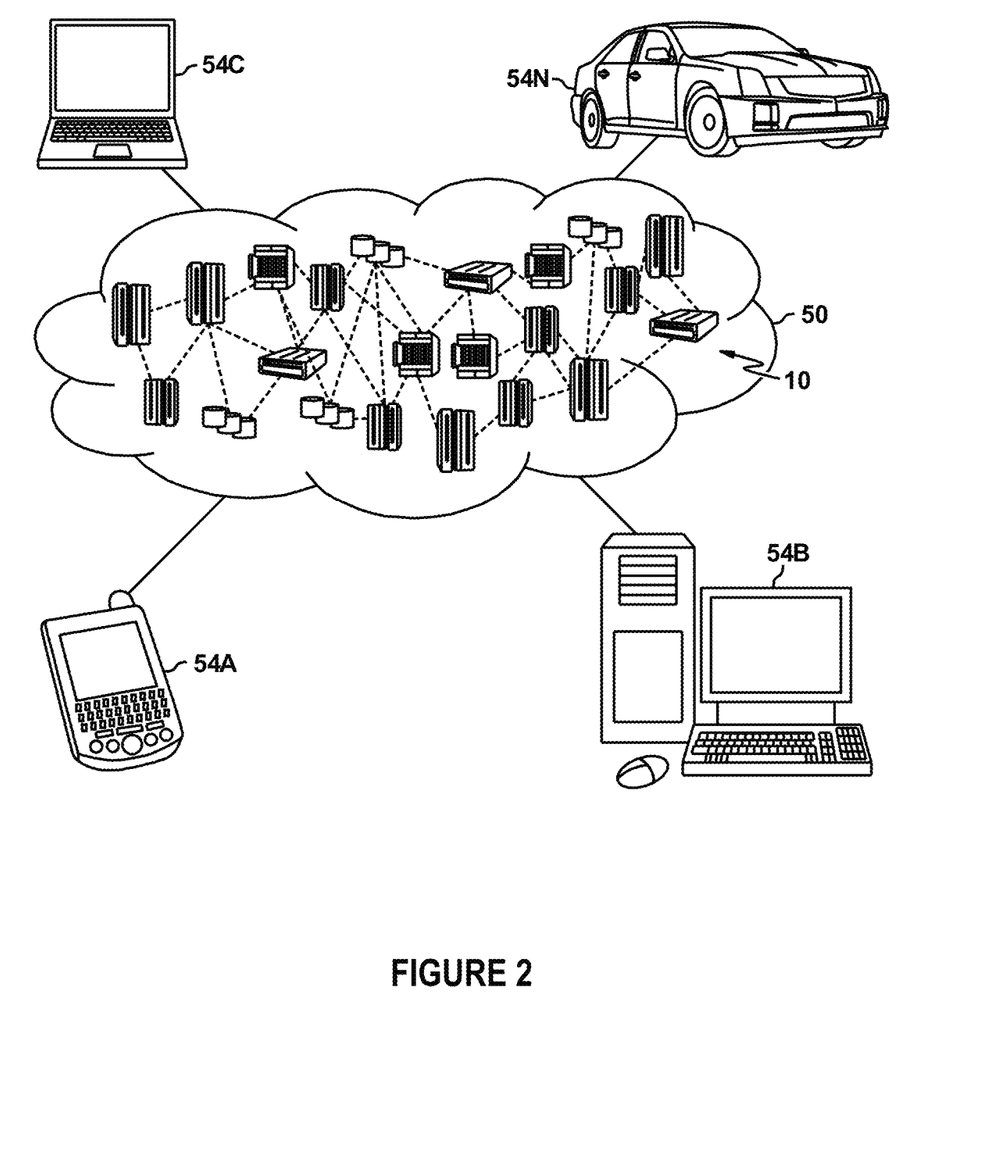
FIG. 2 depicts a cloud computing environment, according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
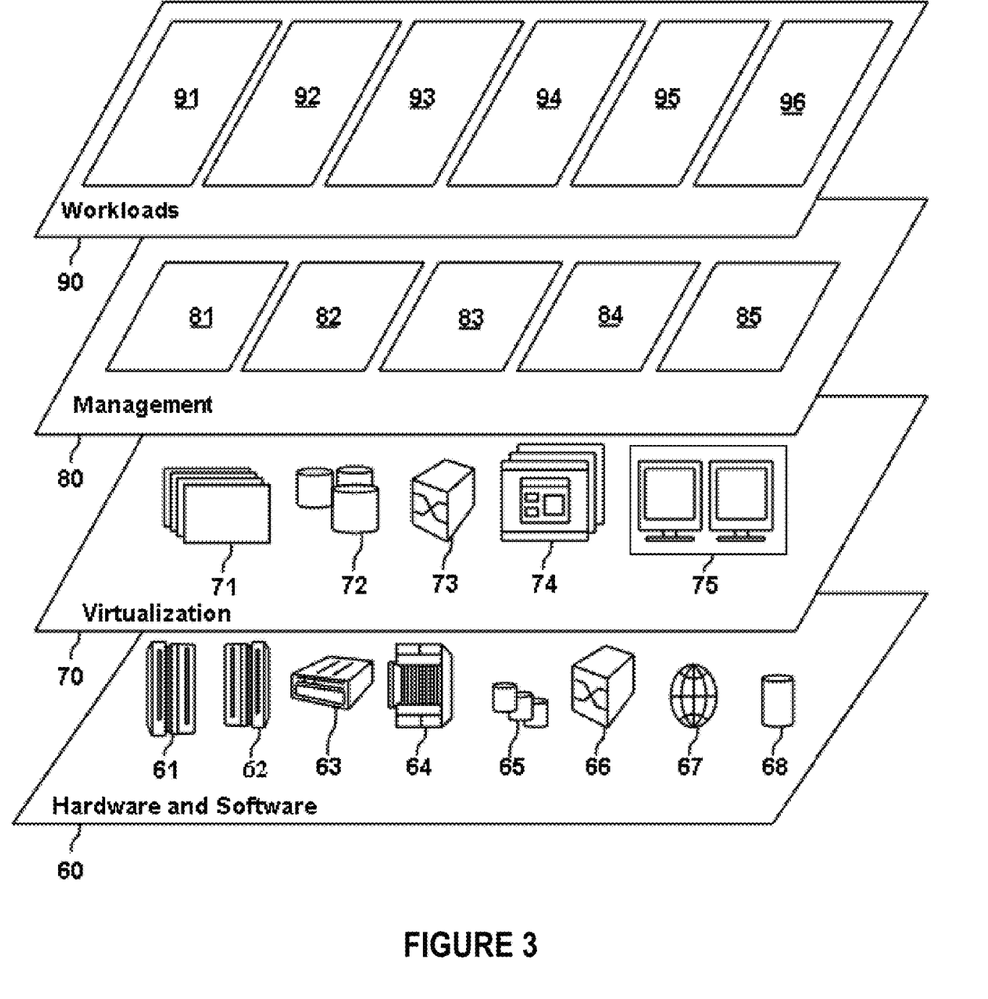
FIG. 3 depicts abstraction model layers, according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 may include hardware and software components. Examples of hardware components may include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and authentication management 96 according to embodiments of the disclosure.

As discussed in the above, authentication management is an emerging issue accompanying the adoption of hybrid clouds. As hybrid clouds let enterprises choose where to place workloads and data based on compliance, audit, policy and security requirements, there are typically various authentication services adopted in a hybrid cloud solution. Embodiments in the present disclosure enable authentication management in the hybrid cloud solution.

The present disclosure may contain various accessible data sources, such as memory 28, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program/utility 40 enables the authorized and secure processing of personal data. Program/utility 40 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Program/utility 40 provides information regarding personal data and the nature (e.g., type, scope, purpose, duration, etc.) of the processing. Program/utility 40 provides the user with copies of stored personal data. Program/utility 40 allows the correction or completion of incorrect or incomplete personal data. Program/utility 40 allows the immediate deletion of personal data.

Figure 4:
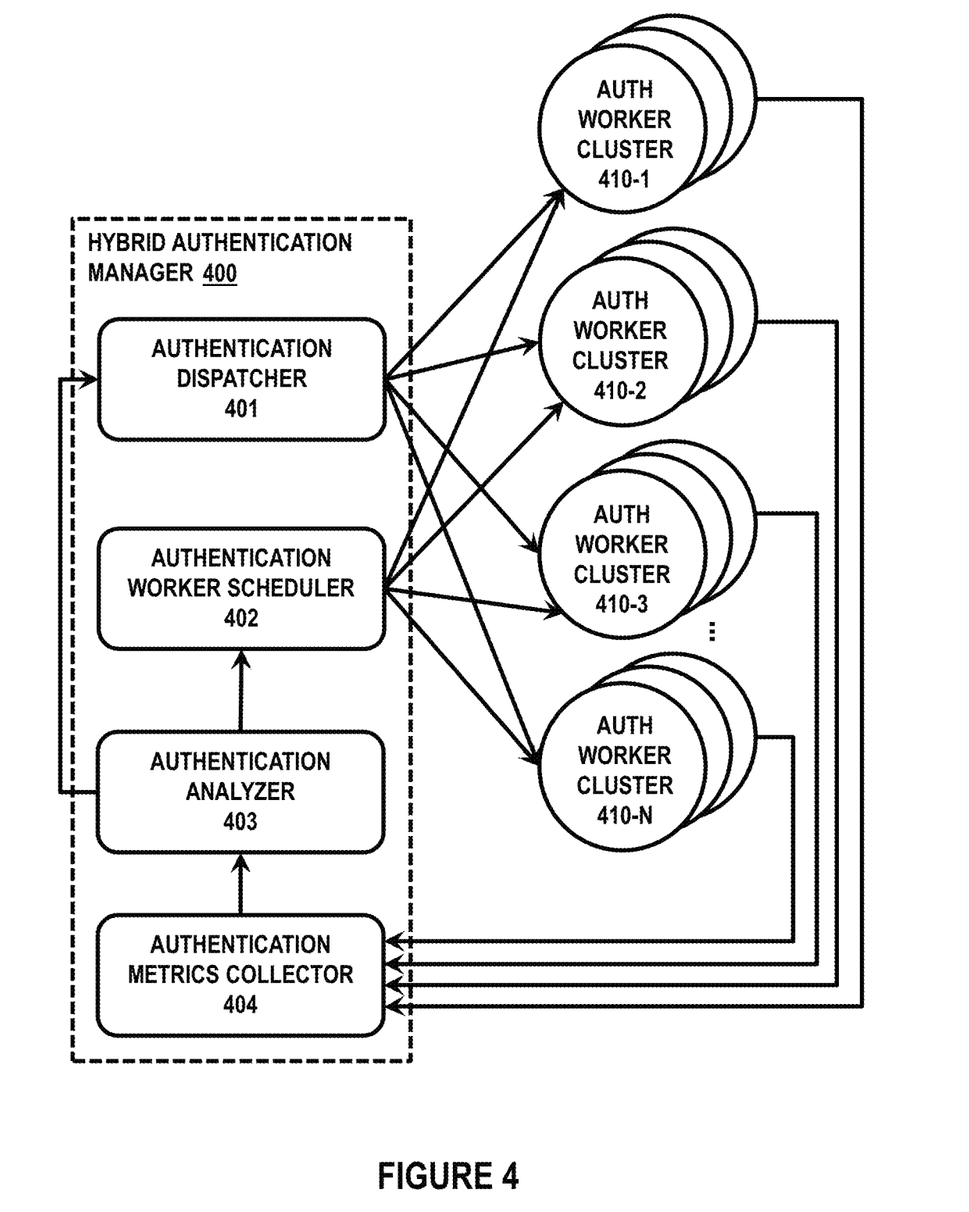
FIG. 4 depicts a block diagram of an exemplary hybrid authentication manager, according to an embodiment of the present disclosure.

Referring now to FIG. 4, which depicts a block diagram of an exemplary hybrid authentication manager 400 according to some embodiments in the present disclosure. The hybrid authentication manager 400 provide users of a hybrid cloud with transparent, smooth authentication service experiences without worrying what authentication service the users need to use. It should be pointed out that although embodiments in the present disclosure are discussed with the hybrid clouds, any other computing systems with various authentication services can enjoy the benefits of the invention, thus embodiments in the present disclosure should not adversely limit the scope of the invention.

According to some embodiments in the present disclosure, the hybrid authentication manager 400 can include an authentication dispatcher 401, and an authentication worker scheduler 402, each may be coupled to various authentication services of a hybrid cloud. According to some embodiments in the present disclosure, the various authentication services may be clustered into a plurality of authentication worker clusters 410-1, 410-2, 410-3, . . . , 410-N based on their authentication types, e.g., cluster 410-1 may be basic authentication which is based on based-64 encode and/or signature algorithms, cluster 410-2 may be API-key authentication which is based on API ID and API secret, cluster 410-3 may be cookie-based authentication which is based on browser, and cluster 410-N may be OAuth-based access delegation. The above listed authentication types are only for the purpose of illustration. According to some embodiments in the present disclosure, the various authentication services may also be clustered based on other criteria suitable for various needs, for example, based on their respective security levels. The respective clusters function as backups to each other such that if a certain cluster fails to provide its authentication service, other clusters may provide authentication service instead.

In the following, for the purpose of simplified illustration, each of the authentication worker cluster 410-1, 410-2, 410-3, . . . , or 410-N will be referred to as an authentication service (authentication service 410-1, 410-2, 410-3, . . . , or 401-N), with each authentication service representing a collection of authentication services in the same cluster.

Also shown in FIG. 4, the hybrid authentication manager 400 may also include an authentication metrics collector 404 that collects authentication metrics of the respective authentication services the dispatcher 401 and worker scheduler 402 are coupled to, and an authentication analyzer 403 that analyzes the collected authentication metrics and provides the analyzed metrics to the dispatcher 401 and the worker scheduler 402.

The authentication dispatcher 401 may be configured to dispatch a request to initiate an authentication received from a user to an appropriate authentication service. According to some embodiments in the present disclosure, the dispatch of the request to a certain appropriate authentication service may be determined dynamically based on respective authentication metrics of respective authentication services the dispatcher 401 is coupled to. The respective authentication metrics of the respective authentication services, according to some embodiments in the present disclosure, may be collected in real-time during the service periods of the respective authentication services by the collector 404 and analyzed by the analyzer 403, and then further provided to the dispatcher 401 and worker scheduler 402 in real-time. According to some embodiments in the present disclosure, the respective authentication metrics collected during the service periods may be sent to the analyzer 403 as historical data, and the analyzer 403 may conduct an analysis on historically collected authentication metrics and provide an analysis result to the dispatcher 401 and worker scheduler 402.

According to some embodiments in the present disclosure, authentication metrics may comprise any metrics that may affect the outcome of an authentication. Such metrics may comprise, for example, i) a user level metric that represents the user level an authentication service is being associated with; ii) a performance metric that represents the performance of an authentication service (e.g., response time); iii) a security level metric of the resources being accessed, which represents the security level of the resources being accessed; iv) a historical success rate metric, which represents historical success rate of an authentication service; v) an access frequency metric, which represent a historical access frequency of an authentication service, and etc. The authentication metrics listed above are merely illustrative and should not adversely limit the scope of the invention.

According to some embodiments in the present disclosure, some metrics may be collected in real-time during the service periods of an authentication service, e.g., real-time performance metrics of respective authentication services, and some metrics may be analyzed based on historical statistic data, e.g., success rate and access frequency. For some metrics, either real-time collected or historical statistic data may be used, e.g., response time.

According to some embodiments of the present disclosure, the analyzer 403 may output the analysis result of the authentication services 410-1, 410-2, 410-3, . . . , 410-N. The result may be in the form of a ranked list of the authentication services based on their respective metrics. An authentication service near the top of the ranked list may have a higher priority compared to authentication services near the bottom of the ranked list, or vice versa. The ranked list may be changed in real-time, or periodically after each analysis conducted by the analyzer 403. It should be pointed out that the ranked list discussed above is merely an exemplary form of the analysis result, which may be in any other suitable forms.

According to some embodiments in the present disclosure, the analysis result may be based on a collection of metrics selected to represent a certain type of authentication capability of the respective authentication services (e.g., security levels provided by the services), or to represent a composite authentication capability of the respective authentication services (e.g., responsiveness of those services providing a certain security level). The collection of metrics selected may be pre-configured by administrators of the hybrid authentication manager 400, and/or dynamically changed during the service periods of respective authentication services.

According to some embodiments in the present disclosure, the collector 404 may collect respective metrics continuously or periodically, and the analyzer 403 may conduct the analysis in real-time or periodically.

Figure 5:
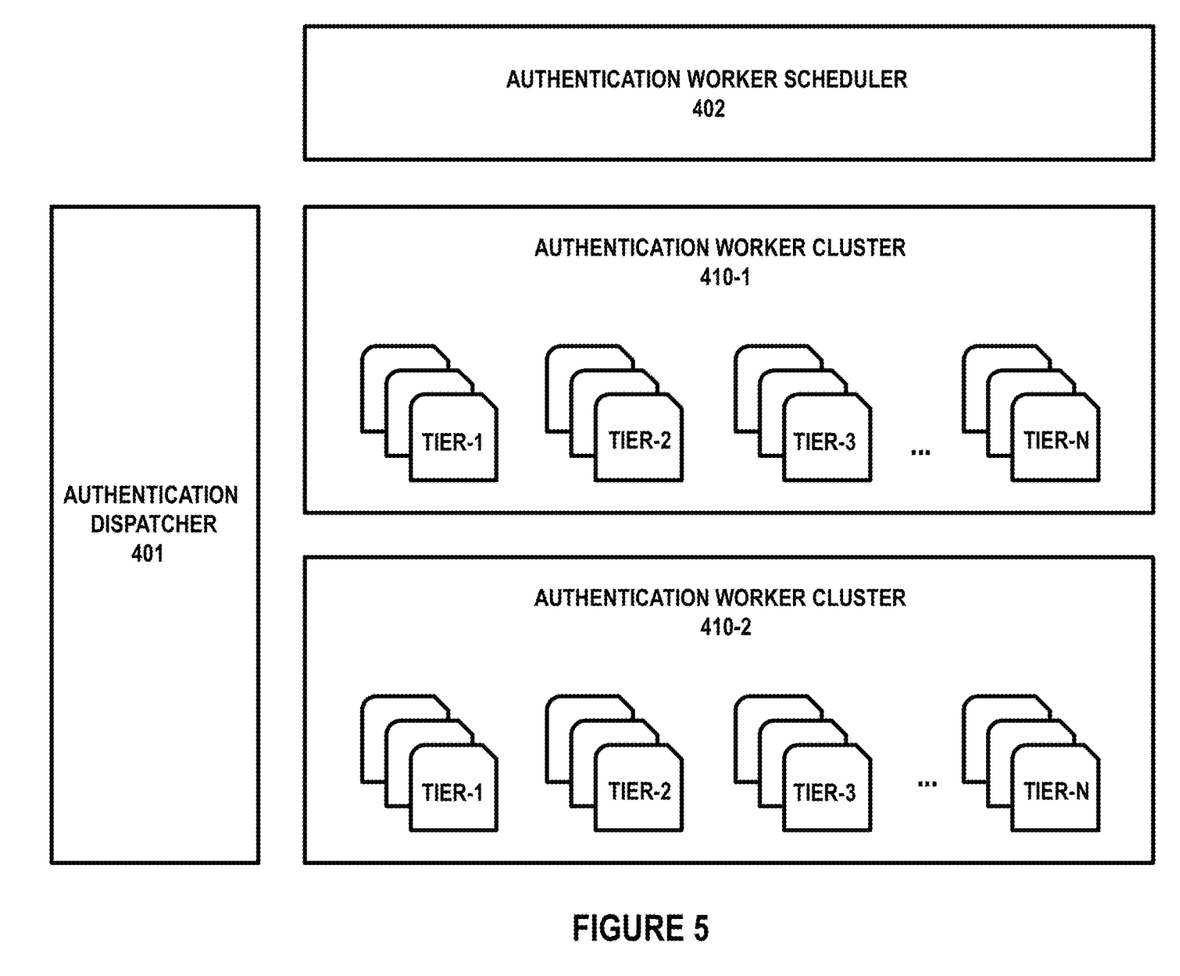
FIG. 5 depicts a block diagram of exemplary authentication worker clusters of FIG. 4, according to an embodiment of the present disclosure.

Now referring to FIG. 5, in which a block diagram of exemplary authentication worker clusters (e.g., authentication services) in FIG. 4 according to some embodiments in the present disclosure are depicted. According to some embodiments in the present disclosure, each of the authentication services 410-1, 410-2, 410-3, . . . , 410-N may include a plurality of service tiers (e.g., tier-1, tier-2, tier-3, . . . , tier-N), with each tier providing an authentication service that belongs to the same type of authentication service. According to some embodiments in the present disclosure, the authentication service provided by each of the service tiers may be different from each other, yet still belongs to the same type of authentication service. For example, for service 410-1 that is based on base-64 encode and signature algorithms, service tier-1 may be challenge-response authentication mechanism (CRAM) based on the HMAC-MD5 algorithm (CRAM-MD5), service tier-2 may be Digest-MD5. The respective service tiers within the same type of authentication service function as backups to each other such that if a certain service tier fails to provide a corresponding authentication service, other service tier may provide an authentication service of a similar type instead.

In an embodiment of the present disclosure, the hybrid authentication manager 400 utilizes the collector 404 to collect respective authentication metrics for the plurality of service tiers of each authentication service, which are provided to the analyzer 403. Also, the hybrid authentication manager 400 provides an analysis result of the analyzer 403 to the dispatcher 401 and the worker scheduler 402. In this embodiment, the ways collector 404 collects the authentication metrics of respective service tiers, and the analyzer 403 analyzes, are similar to what has been discussed above with reference to the authentication metrics of the respective authentication services. Also, the form of the analysis result of the service tiers is also similar to what has been discussed above with reference to the respective authentication services.

In an embodiment of the present disclosure, the hybrid authentication manager 400 configures the authentication worker scheduler 402 to schedule the request received from a user to an appropriate service tier. According to some embodiments of the present disclosure, the hybrid authentication manager 400 utilizes respective authentication metrics of respective service tiers of the selected authentication service dispatched by the dispatcher 401 to dynamically determine the schedule of the request to a certain appropriate service tier.

Figure 6:
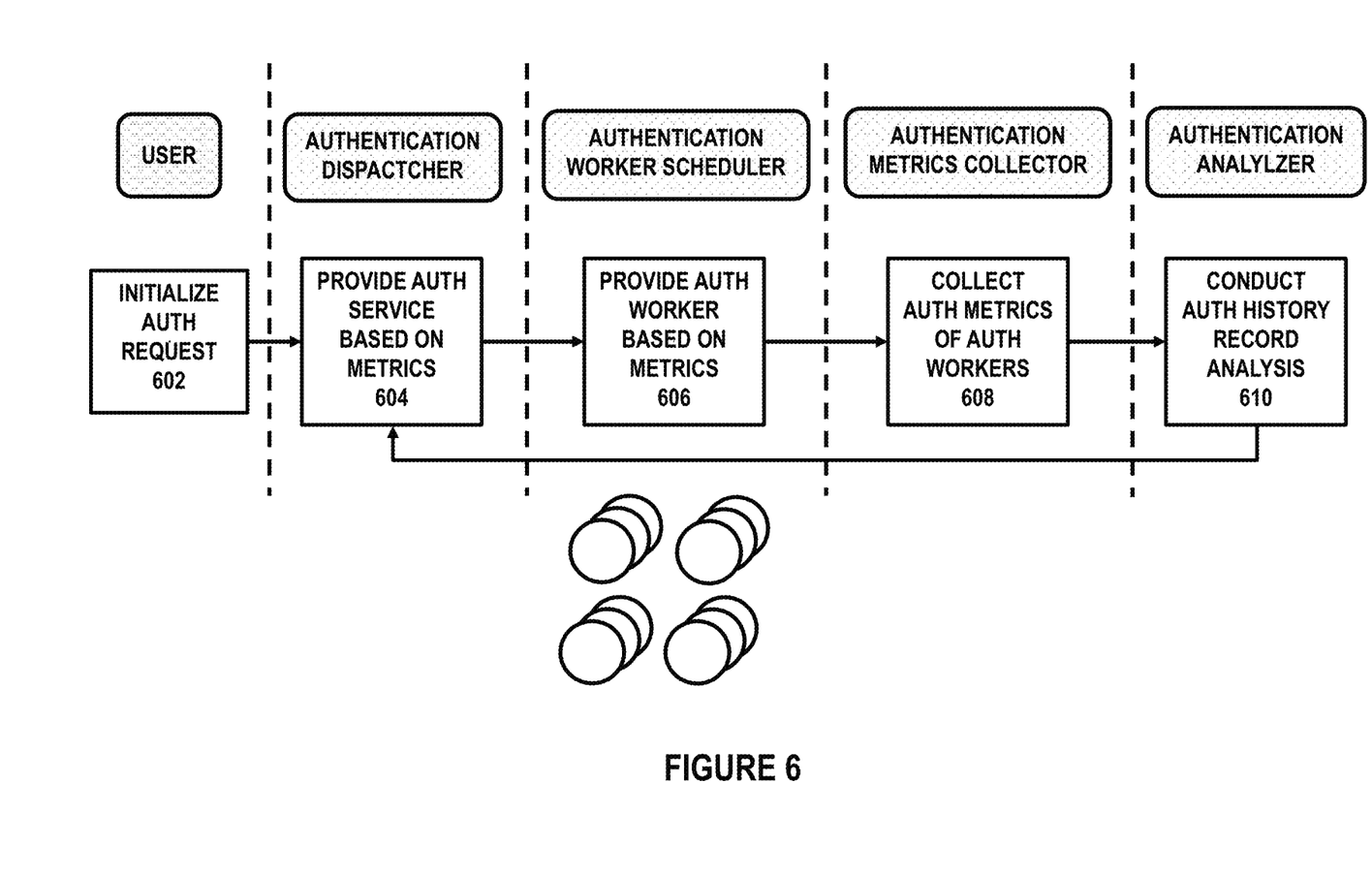
FIG. 6 depicts a flowchart of an overview of an exemplary method, according to an embodiment of the present disclosure.

Now referring to FIG. 6, which depicts a flowchart of an overview of an exemplary method according to some embodiments in the present disclosure. FIG. 6 is a high-level overview of the invention. Responsive to the authentication dispatcher 401 receiving a request to initiate an authentication received from a user at 602, the authentication dispatcher 401 provides a selected authentication service of a plurality of authentication services 410-1, 410-2, 410-3, . . . , 410-N and directs the request to the selected authentication service at 604. The authentication dispatcher 401 dynamically determines the selected authentication service based on respective authentication metrics of the plurality of authentication services. For example, the authentication dispatcher 401 can utilize the ranked list provided by the analyzer 403, as aforementioned, to determine the selected authentication service, where an authentication service with a higher priority may be selected first. Then within the selected authentication service, the authentication worker scheduler 402 provides at 606, a selected service tier of a plurality of service tiers (e.g., tier-1, tier-2, tier-3, . . . , tier-N) and direct the request to the selected service tier. The authentication worker scheduler 402 dynamically determines the selected service tier based on respective authentication metrics of the plurality of service tiers within the selected authentication service. For example, the authentication worker scheduler 402 can utilize the ranked list provided by the analyzer 403, as aforementioned, to determine the selected service tier, where a service tier with a higher priority may be selected first.

In an embodiment of the present disclosure, the collector 404 collects respective authentication metrics of the authentication services and of the service tiers at 608, and then provides the collected metrics to the analyzer 403. In this embodiment, the analyzer 403 analyzes the collected metrics at 610, and provides an analysis result to the dispatcher 401 and the scheduler 402. The collection by the collector 404 and the analysis by the analyzer 403 of respective authentication metrics may be conducted in real-time or periodically, such that each time a user initiates an authentication, the authentication dispatcher 401 dynamically determines an authentication service/service tier to provide a more available, functioning, and/or responsive authentication service.

According to some embodiments of the present disclosure, authentication information can be received via the selected authentications service. In an embodiment of the present disclosure, the hybrid authentication manager 400 utilizes a user profile, which stores authentication information of the user corresponding to the plurality of authentication services, associated with the user, and the hybrid authentication manager 400 retrieves the authentication information from the user profile via the authentication service.

According to some embodiments in the present disclosure, responsive to the hybrid authentication manager 400 receiving a failed response from the selected service tier of the selected authentication service, the hybrid authentication manager 400 directs the request to a next service tier within the same type of authentication service. The next service tier can be dynamically determined based on the authentication metrics of the plurality of service tiers. The direction of the request is transparent to the user, i.e., the user is not aware of the direction.

According to some embodiments of the present disclosure, responsive to the hybrid authentication manager 400 receiving failed responses from all service tiers of the selected authentication service, the hybrid authentication manager 400 directs the request to a next authentication service. The next authentication service can be dynamically determined based on the authentication metrics of the plurality of authentication services. According to some embodiments of the present disclosure, the direction of the request is transparent to the user, i.e., the user is not aware of the direction. Such transparent direction can be accomplished by the hybrid authentication manager 400 retrieving the authentication information of the user corresponding to the next authentication service from a user profile, which stores authentication information of the user corresponding to the plurality of authentication services, that is associated with the user.

The transparent direction of request among service tiers within an authentication service as well as among authentication services provides the user a much-improved user experience. However, according to some embodiments of the present disclosure, responsive to the direction of the request to a next authentication service, the user may be requested to provide authentication information corresponding to the next authentication service, which may result in a less improved user experience. But if compared with existing approaches in known in the arts where a failed response will be returned to the user only after one specific authentication try, the user experience is still much improved.

Figure 7:
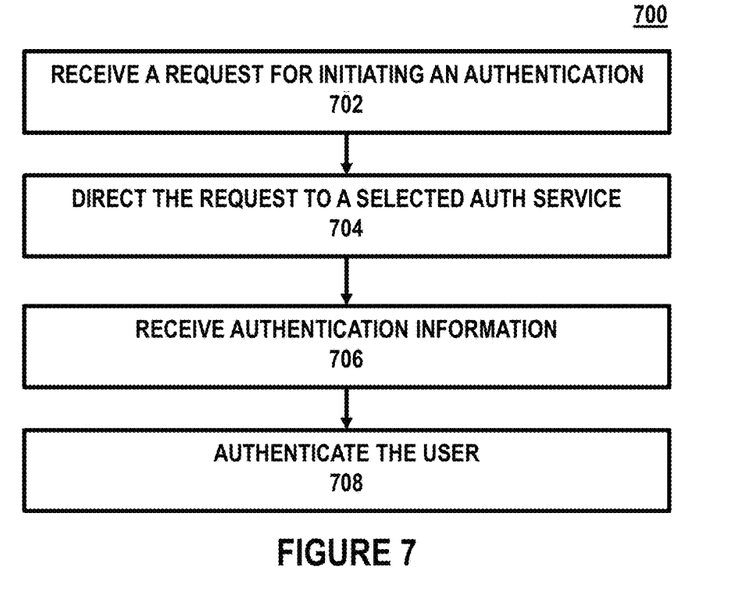
FIG. 7 depicts a flowchart of an exemplary method, according to an embodiment of the present disclosure.

Referring now to FIG. 7, which depicts a flowchart of an exemplary method according to some embodiments in the present disclosure.

At step 702 of the exemplary method 700, the hybrid authentication manager 400 of FIG. 4 receives a request to initiate an authentication. For example, the request to initiate an authentication can be triggered by a click on a hyperlink that directs to a login page.

At step 704 of the exemplary method 700, the hybrid authentication manager 400 directs the request to a selected authentication service of a plurality of authentication services, e.g., authentication services 410-1, 410-2, 410-3, . . . , 410-N. The hybrid authentication manager 400 utilizes respective authentication metrics of the plurality of authentication services 410-1, 410-2, 410-3, . . . , 410-N to dynamically determine the selected authentication service. For example, the collector 404 collects the respective authentication metrics and the authentication analyzer 403 analyzes the respective authentication metrics.

At step 706 of the exemplary method 700, the hybrid authentication manager 400 receives authentication information via the selected authentications service. According to some embodiments of the present disclosure, the hybrid authentication manager 400 receives the authentication information from the user via the selected authentications service. According to some embodiments of the present disclosure, the hybrid authentication manager 400 receives the authentication information from a user profile, which includes authentication information of the user corresponding to the plurality of authentication services associated with the user, via the selected authentications service. And then at step 708 of the exemplary method 700, the hybrid authentication manager 400 authenticates the user via the selected authentications service using the retrieved authentication information.

Figure 8:
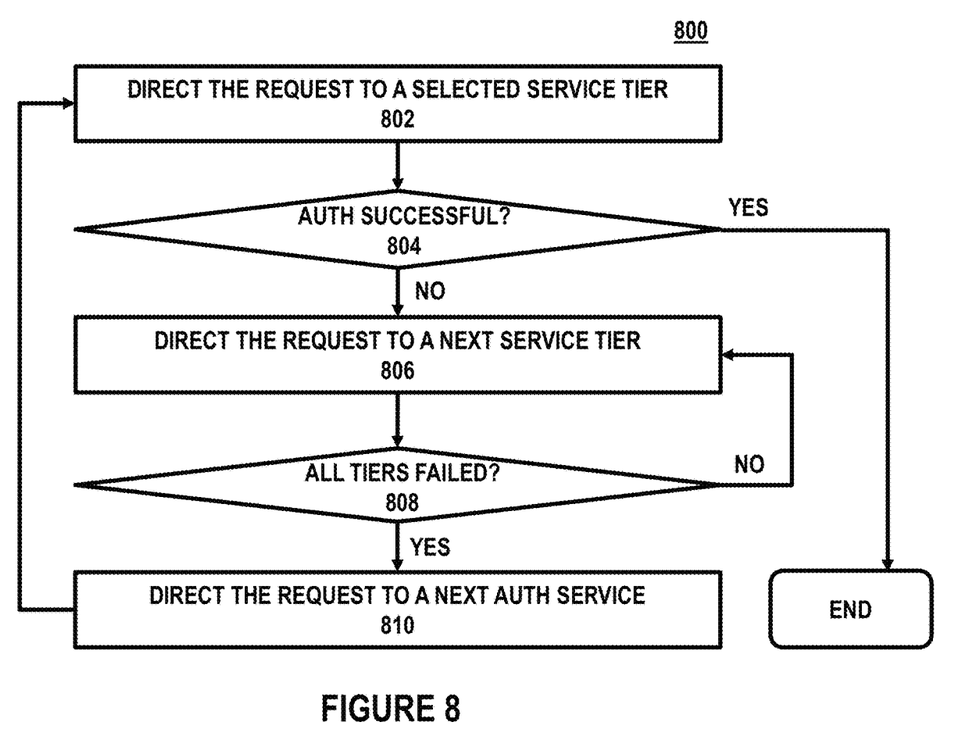
FIG. 8 depicts a flowchart of another exemplary method, according to an embodiment of the present disclosure.

Now referring to FIG. 8, which depicts a flowchart of another exemplary method according to some embodiments in the present disclosure.

According to some embodiments of the present disclosure, each of the plurality of authentication services may be associated with a plurality of service tiers. At step 802 of the exemplary method 800, the hybrid authentication manager 400 can further direct the request to a selected service tier of the selected authentication service. The hybrid authentication manager 400 dynamically determines the selected service tier based on respective authentication metrics of the plurality of service tiers.

At step 804 of the exemplary method 800, the hybrid authentication manager 400 determines whether the authentication is successful based on the authentication information received from the user, e.g., via the selected authentication service. If, authentication is successful, the exemplary method 800 ends. If, however, the authentication is unsuccessful, e.g., responsive to a failed response from the selected service tier, the request may be directed to a next service tier. The next service tier may be dynamically determined based on the authentication metrics of the plurality of service tiers.

Then, at step 808 of the exemplary method 800, the hybrid authentication manager 400 determines whether all tiers within the same authentication service have been failed. If no, the request may be directed to a further service tier. If yes, the request may be directed to a next authentication service at step 810 of the exemplary method 800. Then, the exemplary method 800 flows back to step 802, in which the request may be directed to a selected service tier of the next authentication service.

The steps 802, 804, 806, 808 of the exemplary method 800 may be iterated until the user has been authenticated or failed due to all authentication services failing to respond.

Embodiments of the present disclosure have been described in the above. It should be noted that the authentication management according to embodiments of this disclosure could be implemented by computer system/server 12 of FIG. 1.

The present invention may be a system, a method, and/or a computer program product at any possible technical detail level of integration. The invention may be beneficially practiced in any system, single or parallel, which processes an instruction stream. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:
   receiving, by one or more processors, a request to initiate an authentication from a computing device of a user;
   directing, by one or more processors, the request to a selected authentication service of a plurality of authentication services, wherein the selected authentication service is determined dynamically based on respective authentication metrics of the plurality of authentication services;
   receiving, by one or more processors, authentication information via the selected authentication service; and
   authenticating, by one or more processors, the user based on the received authentication information.

2. The computer implemented method according to claim 1, wherein directing the request, further comprises:
   directing, by one or more processors, the request to a selected service tier of the selected authentication service, wherein each of the plurality of authentication services is associated with a plurality of service tiers, and wherein the selected service tier is determined dynamically based on respective authentication metrics of the plurality of service tiers.

3. The computer implemented method according to claim 2, further comprising:
   responsive to a failed response from the selected service tier of the selected authentication service, directing, by one or more processors, the request to a second service tier of the selected authentication service, wherein authentication metrics of the second service tier are inferior to the selected service tier based at least in part on ranks of respective authentication metrics.

4. The computer implemented method according to claim 2, further comprising:
   responsive to failed responses from all service tiers of the selected authentication service, directing, by one or more processors, the request to a second authentication service of the plurality of authentication services.

5. The computer implemented method according to claim 4, further comprising:
   retrieving, by one or more processors, the authentication information of the user corresponding to the second authentication service from a user profile associated with the user, wherein the user profile stores authentication information of the user corresponding to the plurality of authentication services.

6. The computer implemented method according to claim 1, wherein the authentication metrics are selected from the group consisting of: a user level metric, a performance metric, a security level metric of resources being accessed, a historical success rate metric, and an access frequency metric.

7. The computer implemented method according to claim 1, wherein the respective authentication metrics of the plurality of authentication services and the respective authentication metrics of a plurality of service tiers are updated in real-time.

8. A computer program product comprising one or more computer readable storage devices and collectively stored program instructions on the one or more computer readable storage devices, the stored program instructions comprising:
   program instructions to receive a request to initiate an authentication from a computing device of a user;
   program instructions to direct the request to a selected authentication service of a plurality of authentication services, wherein the selected authentication service is determined dynamically based on respective authentication metrics of the plurality of authentication services;
   program instructions to receive authentication information via the selected authentication service; and
   program instructions to authenticate the user based on the received authentication information.

9. The computer program product according to claim 8, wherein the stored program instructions to direct the request, further comprise:
   program instructions to direct the request to a selected service tier of the selected authentication service, wherein each of the plurality of authentication services is associated with a plurality of service tiers, and wherein the selected service tier is determined dynamically based on respective authentication metrics of the plurality of service tiers.

10. The computer program product according to claim 9, the stored program instructions further comprising:
    responsive to a failed response from the selected service tier of the selected authentication service, program instructions to direct the request to a second service tier of the selected authentication service, wherein authentication metrics of the second service tier are inferior to the selected service tier based at least in part on ranks of respective authentication metrics.

11. The computer program product according to claim 9, the stored program instructions further comprising:
    responsive to failed responses from all service tiers of the selected authentication service, program instructions to direct the request to a second authentication service of the plurality of authentication services.

12. The computer program product according to claim 11, the stored program instructions further comprising:
    program instructions to retrieve the authentication information of the user corresponding to the second authentication service from a user profile associated with the user, wherein the user profile stores authentication information of the user corresponding to the plurality of authentication services.

13. The computer program product according to claim 8, wherein the authentication metrics are selected from the group consisting of: a user level metric, a performance metric, a security level metric of resources being accessed, a historical success rate metric, and an access frequency metric.

14. The computer program product according to claim 8, wherein the respective authentication metrics of the plurality of authentication services and the respective authentication metrics of a plurality of service tiers are updated in real-time.

15. A computer system, the computer system comprising:
one or more computer processors;
one or more computer readable storage devices; and
stored program instructions on the one or more computer readable storage devices for execution by the one or more computer processors, the stored program instructions comprising:
program instructions to receive a request to initiate an authentication from a computing device of a user;
program instructions to direct the request to a selected authentication service of a plurality of authentication services, wherein the selected authentication service is determined dynamically based on respective authentication metrics of the plurality of authentication services;
program instructions to receive authentication information via the selected authentication service; and
program instructions to authenticate the user based on the received authentication information.

16. The computer system according to claim 15, wherein the stored program instructions to direct the request, further comprise:
program instructions to direct the request to a selected service tier of the selected authentication service, wherein each of the plurality of authentication services is associated with a plurality of service tiers, and wherein the selected service tier is determined dynamically based on respective authentication metrics of the plurality of service tiers.

17. The computer system according to claim 16, the stored program instructions further comprising:
responsive to a failed response from the selected service tier of the selected authentication service, program instructions to direct the request to a second service tier of the selected authentication service, wherein authentication metrics of the second service tier are inferior to the selected service tier based at least in part on ranks of respective authentication metrics.

18. The computer system according to claim 16, the stored program instructions further comprising:
responsive to failed responses from all service tiers of the selected authentication service, program instructions to direct the request to a second authentication service of the plurality of authentication services.

19. The computer system according to claim 18, the stored program instructions further comprising:
program instructions to retrieve the authentication information of the user corresponding to the second authentication service from a user profile associated with the user, wherein the user profile stores authentication information of the user corresponding to the plurality of authentication services.

20. The computer system according to claim 15, wherein the authentication metrics are selected from the group consisting of: a user level metric, a performance metric, a security level metric of resources being accessed, a historical success rate metric, and an access frequency metric.

* * * * *